(12) United States Patent
Yanoto

(10) Patent No.: US 10,408,156 B2
(45) Date of Patent: Sep. 10, 2019

(54) CONTROL DEVICE

(71) Applicant: DENSO CORPORATION, Kariya, Aichi-pref. (JP)

(72) Inventor: Keisuke Yanoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/775,883

(22) PCT Filed: Nov. 29, 2016

(86) PCT No.: PCT/JP2016/085380
§ 371 (c)(1),
(2) Date: May 14, 2018

(87) PCT Pub. No.: WO2017/098965
PCT Pub. Date: Jun. 15, 2017

(65) Prior Publication Data
US 2018/0328305 A1  Nov. 15, 2018

(30) Foreign Application Priority Data
Dec. 8, 2015 (JP) ................. 2015-239545

(51) Int. Cl.
*F02D 41/24* (2006.01)
*F02D 41/30* (2006.01)
(Continued)

(52) U.S. Cl.
CPC ......... *F02D 41/2467* (2013.01); *F02D 41/20* (2013.01); *F02D 41/3005* (2013.01);
(Continued)

(58) Field of Classification Search
CPC .. F02D 41/2467; F02D 41/3005; F02D 41/30; F02D 41/20; F02D 41/34; F02M 51/00; F02M 51/06; F02M 61/10
See application file for complete search history.

(56) References Cited

U.S. PATENT DOCUMENTS

2012/0080542 A1  4/2012  Imai
2014/0216419 A1*  8/2014  Wirkowski ............. F02D 41/20
                                                123/506
(Continued)

FOREIGN PATENT DOCUMENTS

EP     3 150 831     4/2017
JP     2014-152697    8/2014
(Continued)

OTHER PUBLICATIONS

Tanaka Makoto et al., U.S. Appl. No. 15/751,272, filed Feb. 8, 2018 (40 pages).

*Primary Examiner* — Jacob M Amick
(74) *Attorney, Agent, or Firm* — Nixon & Vanderhye PC

(57) ABSTRACT

A control device that is to output a driving signal to a fuel injector includes a full-lifting valve-closing response acquisition unit to acquire a full-lifting valve-closing profile indicating a valve-closing behavior of the fuel injector from a full-lifting state of a valve body constituting the fuel injector, based on a behavior of an electric signal from the full-lifting state to a closing state of the valve body, and a valve-opening response estimation unit to estimate a valve-opening profile indicating a valve-opening behavior when a valve-opening driving signal is input to the fuel injector, based on at least the full-lifting valve-closing profile.

9 Claims, 8 Drawing Sheets

(51) Int. Cl.
  *F02M 51/00* (2006.01)
  *F02D 41/20* (2006.01)
  *F02M 51/06* (2006.01)
  *F02D 41/34* (2006.01)
  *F02M 61/10* (2006.01)

(52) U.S. Cl.
  CPC ............ *F02D 41/34* (2013.01); *F02M 51/00* (2013.01); *F02M 51/06* (2013.01); *F02M 61/10* (2013.01); *F02D 2041/2055* (2013.01); *F02D 2041/2058* (2013.01); *F02D 2200/0614* (2013.01); *F02M 51/061* (2013.01)

(56) References Cited

U.S. PATENT DOCUMENTS

| | | | |
|---|---|---|---|
| 2014/0318498 A1* | 10/2014 | Rumpsa | F02D 41/3005 123/478 |
| 2015/0377176 A1 | 12/2015 | Hatanaka et al. | |
| 2016/0076498 A1 | 3/2016 | Aono et al. | |
| 2016/0177855 A1 | 6/2016 | Kusakabe et al. | |
| 2016/0245211 A1 | 8/2016 | Katsurahara et al. | |
| 2017/0175666 A1* | 6/2017 | Kim | F02D 41/1402 |
| 2018/0156147 A1* | 6/2018 | Shi | F02D 41/20 |

FOREIGN PATENT DOCUMENTS

| | | | |
|---|---|---|---|
| JP | 2015-48919 | | 3/2015 |
| JP | 2015048919 A | * | 3/2015 |
| JP | 2015-096720 | | 5/2015 |
| WO | 2017/051652 | | 3/2017 |

* cited by examiner

US 10,408,156 B2

CONTROL DEVICE

CROSS REFERENCE TO RELATED APPLICATION

This application is the U.S. national phase of International Application No. PCT/JP2016/085380 filed Nov. 29, 2016, which designated the U.S. and claims priority to Japanese Patent Application No. 2015-239545 filed on Dec. 8, 2015, the entire contents of each of which are hereby incorporated herein by reference.

TECHNICAL FIELD

The present disclosure relates to a control device which outputs a driving signal to a fuel injector.

BACKGROUND ART

In a control device that outputs a driving signal to a fuel injector, it is required that a variation of a fuel injection quantity is decreased and an exhaust emission and a drive ability is improved. According to Patent Literature 1, an injection quantity variation caused by a lifting quantity variation in a partial-lifting region of the fuel injector is corrected with a precision, and an injection quantity control precision in the partial-lifting region is improved. Specifically, a valve-closing position of the fuel injector is detected. Patent Literature 2 discloses a driving device having an object to surely detect an operation timing of a valve body with a high precision.

PRIOR ART LITERATURES

Patent Literature

Patent Literature 1: JP2015-96720A
Patent Literature 2: JP2014-152697A

SUMMARY OF INVENTION

According to a technology disclosed in Patent Literature 2, a timing that a valve-opening of the fuel injector can be detected, but a timing that the fuel injector starts to open cannot be detected. Since the fuel is injected until the valve-opening is completed after the fuel injector starts to open, the fuel injection quantity cannot be obtained with a precision by only detecting a timing that the valve-opening of the fuel injector is completed. According to a technology disclosed in Patent Literature 1, since only a closing position of the valve body is obtained, a variation at a valve-opening side cannot be obtained. Thus, the fuel injection quantity injected by the fuel injector after the fuel injector starts to open cannot be obtained with a precision.

It is an object of the present disclosure to provide a control device which can execute an injection quantity control with a high precision by obtaining both a valve-opening profile and a valve-closing profile of a fuel injector.

According to the present disclosure, the control device (10) is to output a driving signal to a fuel injector (20, 40). The control device includes a full-lifting valve-closing response acquisition unit (11) to acquire a full-lifting valve-closing profile indicating a valve-closing behavior of the fuel injector from a full-lifting state of a valve body (220, 420) constituting the fuel injector, based on a behavior of an electric signal from the full-lifting state to a closing state of the valve body, and a valve-opening response estimation unit (13) to estimate a valve-opening profile indicating a valve-opening behavior when a valve-opening driving signal is input to the fuel injector, based on at least the full-lifting valve-closing profile.

According to the present disclosure, the full-lifting valve-closing profile that can be specified is obtained according to the behavior of the electric signal including a driving voltage or the driving current, and the valve-opening profile is estimated according to the full-lifting valve-closing profile. Thus, a valve-body behavior that the valve body moves in the valve-opening direction while the driving signal is output and the valve body moves in the valve-closing direction until the valve body is closed while the driving signal is stopped can be obtained.

According to the present disclosure, it is preferable that the control device further includes a partial-lifting valve-closing response acquisition unit (14) to acquire a partial-lifting valve-closing profile indicating a valve-closing behavior of the fuel injector from a partial-lifting state of the valve body, based on the behavior of the electric signal from the partial-lifting state to the closing state of the valve body, and a partial injection quantity estimation unit (15) to estimate a partial-lifting fuel injection quantity in a partial lifting of the fuel injector, based on the valve-opening profile and the partial-lifting valve-closing profile.

In this case, since the partial-lifting fuel injection quantity in the partial lifting of the fuel injector is estimated based on the valve-opening profile and the partial-lifting valve-closing profile, the fuel injection quantity in the partial lifting where a variation is likely to occur can be obtained with a precision.

DESCRIPTION OF EMBODIMENTS

Figure 1:
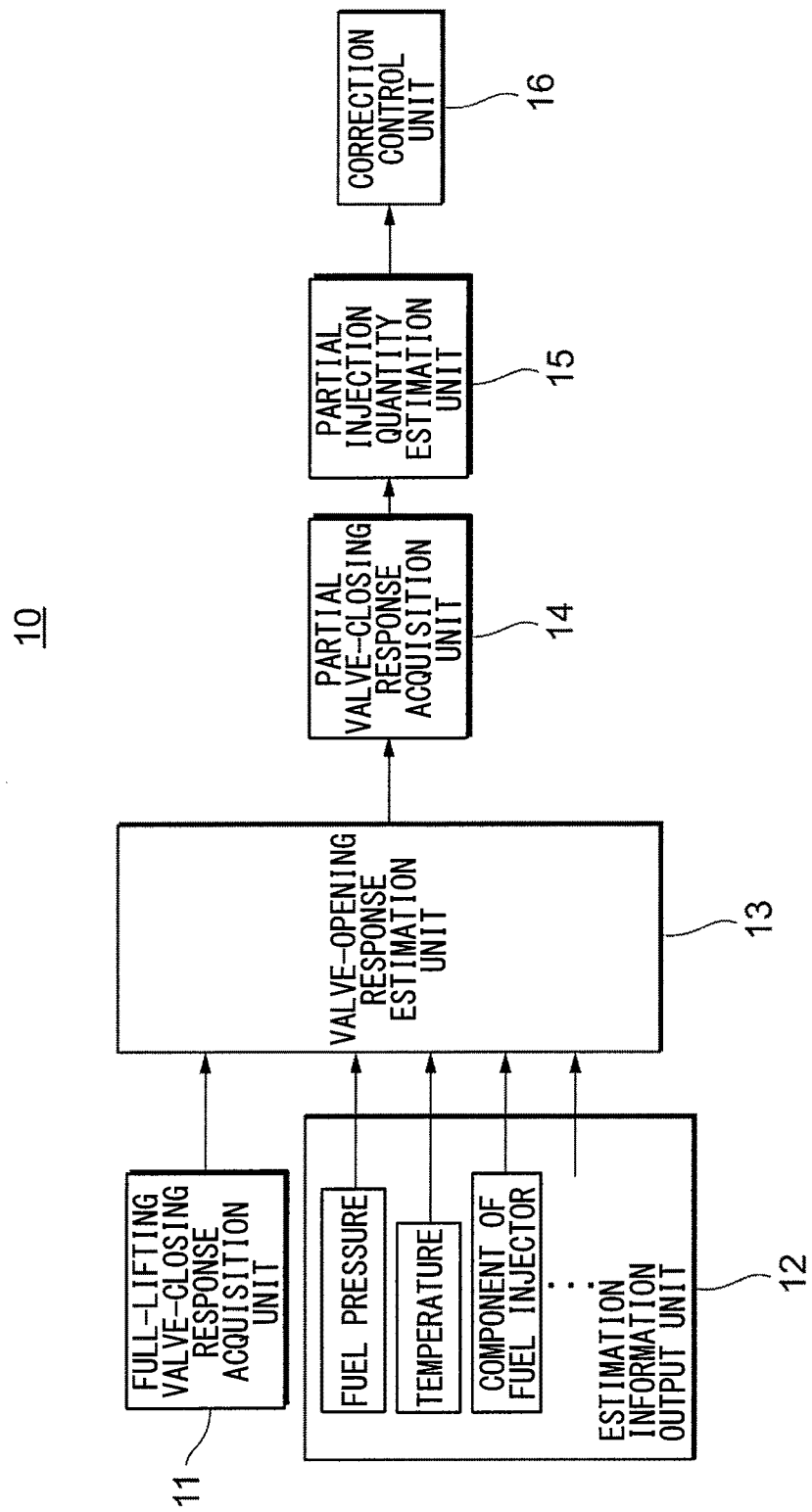
FIG. 1 is a block diagram showing a functional configuration of a control device according to an embodiment.

Embodiments of the present disclosure will be described hereafter referring to drawings. The substantially same parts or components as those in the embodiments are indicated with the same reference numerals and the same descriptions may be omitted.

As shown in FIG. 1, a control device 10 according to the present embodiment includes a full-lifting valve-closing response acquisition unit 11, an estimation information output unit 12, a valve-opening response estimation unit 13, a partial-lifting valve-closing response acquisition unit 14, a partial injection quantity estimation unit 15, and a correction control unit 16.

The full-lifting valve-closing response acquisition unit 11 is a component that acquires a full-lifting valve-closing profile indicating a valve-closing behavior of a fuel injector from a full-lifting state of a valve body constituting the fuel injector that is a control target, based on a behavior of an electric signal from the full-lifting state to a closing state of the valve body.

Figure 2:
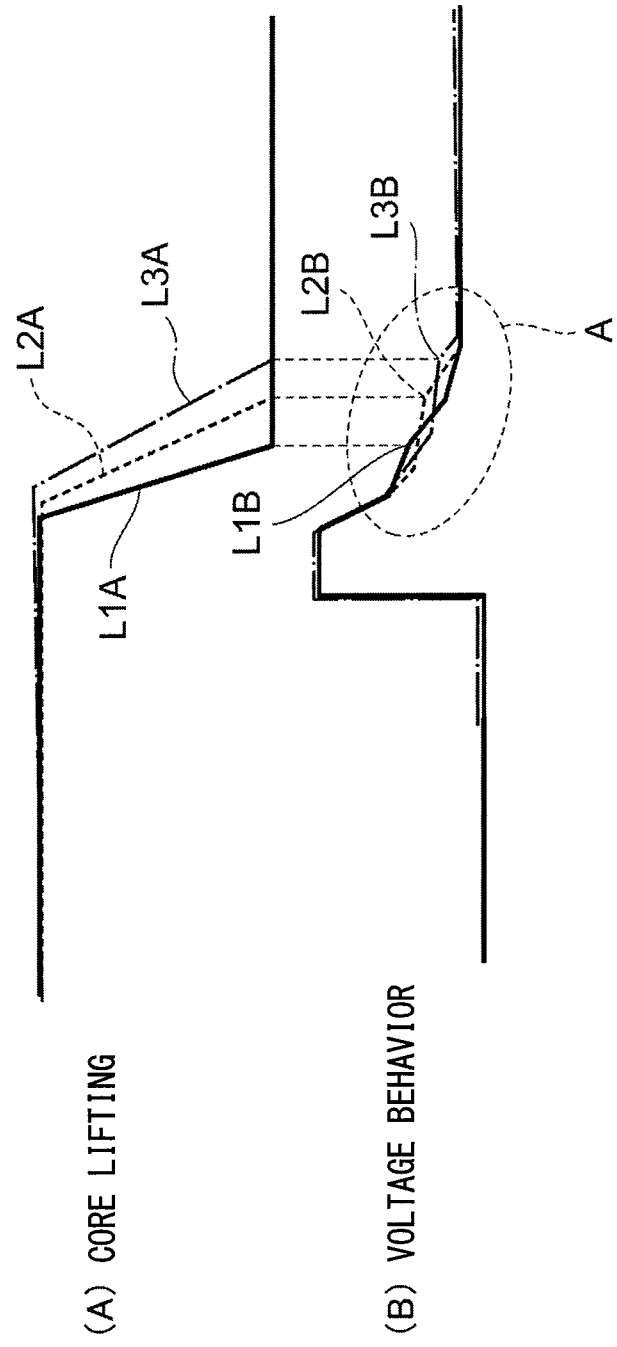
FIG. 2 includes (A) and (B), (A) is a graph showing a core lifting, and (B) is a graph showing a voltage behavior.

FIG. 2 shows an example of the full-lifting valve-closing profile. (A) of FIG. 2 shows a core lifting that is a behavior of a core that moves the valve body. (B) of FIG. 2 shows a behavior of a voltage applied to a solenoid that drives the core. As shown in a region A, a behavior difference of the core lifting is expressed by a behavior difference of the voltage. When a map of a corresponding relationship is previously measured and established, core lifting behaviors L1A, L2A and L3A shown in (A) of FIG. 2 can be acquired by detecting voltage behaviors L1B, L2B and L3B shown in (B) of FIG. 2.

The estimation information output unit 12 is a component that outputs information used to estimate a valve-opening profile of the fuel injector to the valve-opening response estimation unit 13. In this case, the information includes a fuel pressure of the fuel injector that is the control target, an ambient temperature, or component values of the fuel injector.

The valve-opening response estimation unit 13 is a component that estimates the valve-opening profile indicating a valve-opening behavior when the valve-opening driving signal is input to the fuel injector, based on at least the full-lifting valve-closing profile. Specifically, the partial-lifting valve-closing response acquisition unit 14 estimates the valve-opening behavior of the fuel injector that is the control target and estimates a timing that the core lifting starts after receiving a control signal for a valve-opening, by using at least the full-lifting valve-closing profile. In the estimation, information output from the estimation information output unit 12 can be also used.

Figure 3:
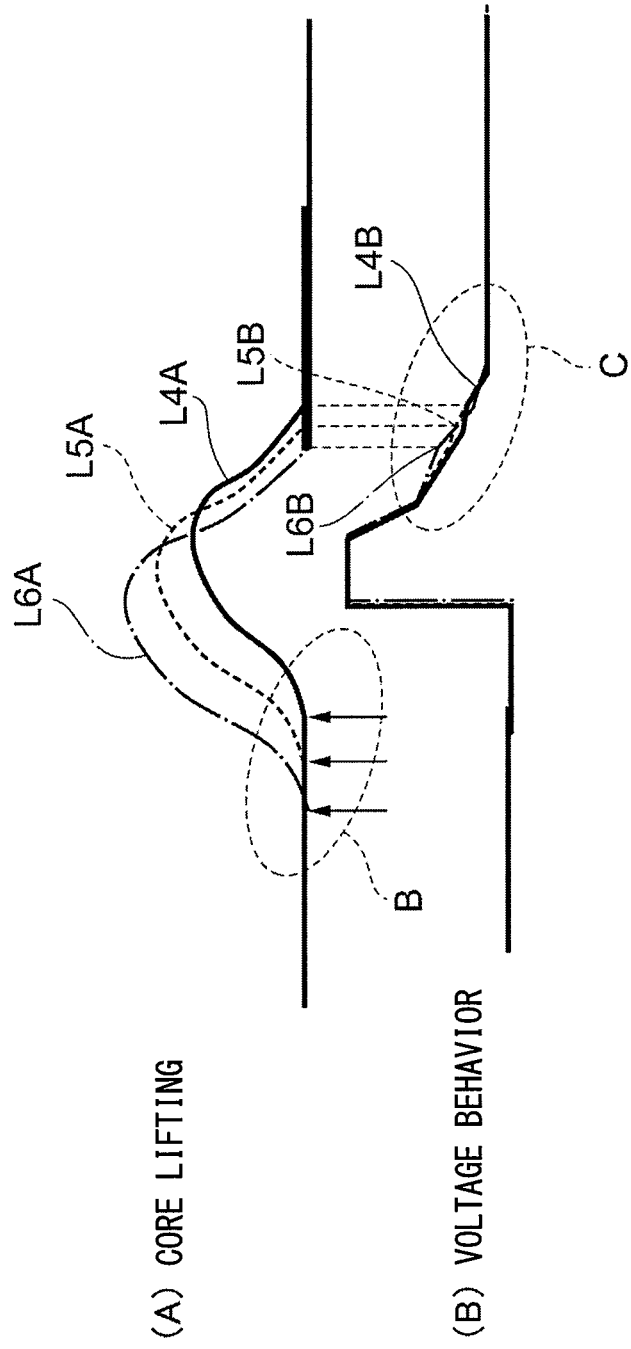
FIG. 3 includes (A) and (B), (A) is a graph showing a core lifting, and (B) is a graph showing a voltage behavior.

FIG. 3 shows an example of a partial-lifting valve-opening profile and a partial-lifting valve-closing profile. (A) of FIG. 3 shows the core lifting that is the behavior of the core that moves the valve body in a total stroke including a valve-opening stroke and a valve-closing stroke. (B) of FIG. 3 shows the behavior of the voltage applied to the solenoid that drives the core in a valve-closing stroke. The valve-opening response estimation unit 13 estimates the valve-opening profile in a partial lifting, as shown in a region B in (A) of FIG. 3.

The partial-lifting valve-closing response acquisition unit 14 is component that acquires the partial-lifting valve-closing profile indicating the valve-closing behavior of the fuel injector from a partial-lifting state of the valve body constituting the fuel injector that is the control target, based on the behavior of the electric signal from the partial-lifting state to the closing state of the valve body.

As shown in a region C in (B) of FIG. 3, the behavior difference of the core lifting is expressed by the behavior difference of the voltage. When a map of a corresponding relationship is previously measured and established, core lifting behaviors L1A, L2A and L3A shown in (A) of FIG. 3 can be acquired by detecting voltage behaviors L4B, L5B and L6B shown in (B) of FIG. 3.

The partial injection quantity estimation unit 15 is a component that estimates a partial-lifting fuel injection quantity in the partial lifting of the fuel injector, based on the valve-opening profile estimated by the valve-opening response estimation unit 13 and the partial-lifting valve-closing profile acquired by the partial-lifting valve-closing response acquisition unit 14. The partial injection quantity estimation unit 15 estimates a flow rate of the fuel that is injected, based on a valve-opening-closing profile in the partial lifting, as shown in (A) of FIG. 3.

The correction control unit 16 is a component that corrects the fuel injection quantity that is injected by the fuel injector that is the control target based on the partial-lifting fuel injection quantity estimated by the partial injection quantity estimation unit 15, and outputs a driving signal corresponding to the fuel injection quantity that is corrected.

Figure 4:
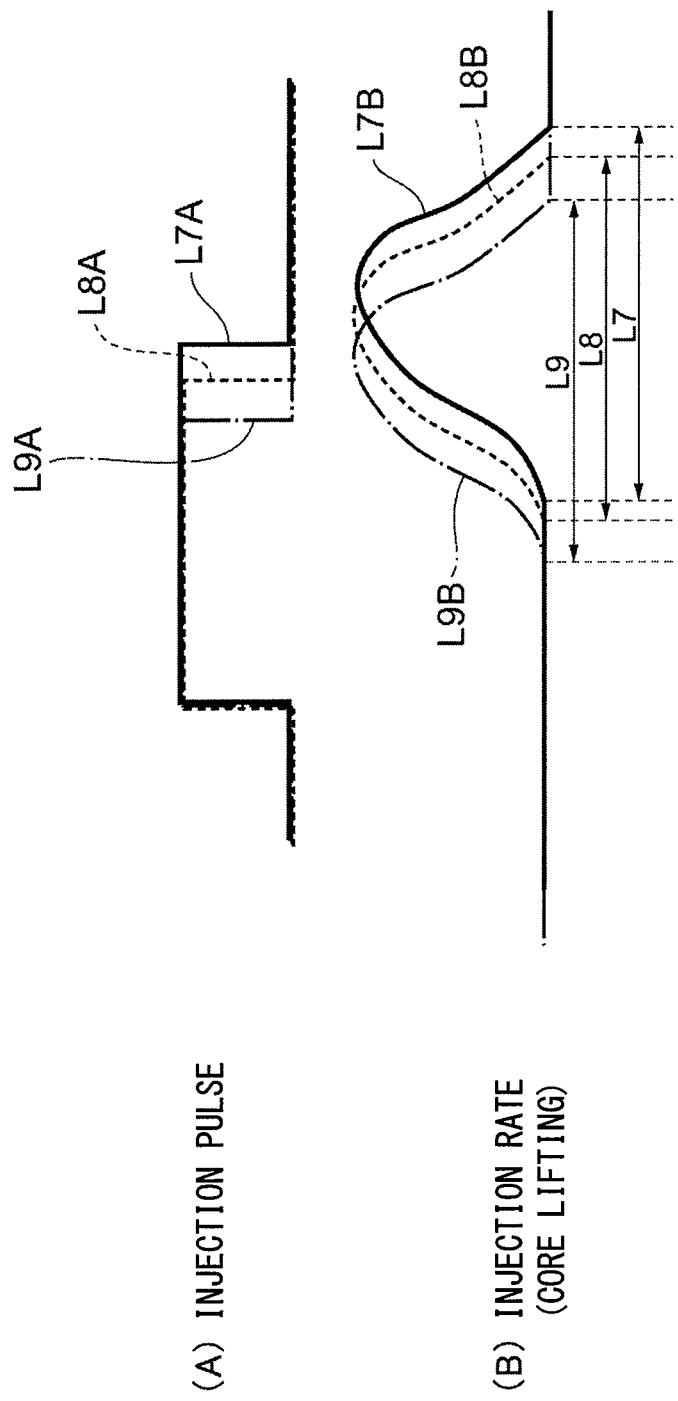
FIG. 4 includes (A) and (B), (A) is a graph showing an injection pulse, and (B) is a graph showing an injection rate.

As shown in (A) of FIG. 4, injection pulses L7A, L8A and L9A as driving signals output by the correction control unit 16 are different in pulse length since the injection pulses L7A, L8A and L9A are corrected in the fuel injectors that are the control targets. Characteristic lines L7B, L8B and L9B indicating a fuel injection rate or the core lifting are identical for the fuel injection quantity. Thus, valve-opening times L7, L8 and L9 indicating fuel injection times have the same length.

Next, the fuel injector that is the control target of the control device 10 will be described referring to FIG. 5. The fuel injector 20 has a configuration that a valve body 220 and a movable core 230 are received in a case that is container having a tubular shape. An injection port 211 that is an outlet of the fuel is at a tip end of the case. An inner wall surface of the case includes a part that surrounds the injection port 211 and at which a valve seat 212 is located.

The valve body 220 is arranged to be movable in a longitudinal direction of the case. When a position of the valve body 220 is a position at a valve-closing side most, a lower end of the valve body 220 is in contact with the valve seat 212, and the injection port 211 is blocked. In this case, the position at the valve-closing side most is a valve-closing position where the injection port 211 is blocked. Thus, the fuel is not injected from the injection port 211. When the movable core 230 and the valve body 220 move toward an upper side, the lower end of the valve body 220 is removed from the valve seat 212. As a result, the fuel is injected from the injection port 211. An injection rate of the fuel increases in accordance with an increase in separation between the valve body 220 and the valve seat 212. The injection rate of the fuel is an injection quantity per unit time. An opening degree of the fuel injector 20 increases in accordance with an increase in separation between the valve body 220 and the valve seat 212 when the valve body 220 is moved toward the upper side.

The entire of the valve body 220 is a substantially columnar shape. The valve body 220 is inserted to penetrate a through hole at a center of the movable core 230. The valve body 220 includes a diameter-enlarging part that a diameter of the diameter-enlarging part is greater than a diameter of the other part of the valve body 220. The diameter-enlarging part is in the vicinity of an end part of the valve body 220 at the upper side. When the fuel injector 20 is closed, a lower surface 222 that is an end surface of the diameter-enlarging part at a lower side is separated from an upper surface 231 that is an end surface of the movable core 230 at the upper side.

A side surface of the valve body 220 includes a part that is located at the lower side relative to the movable core 230 and to which a tubular body 280 is fixed. The tubular body 280 includes a part that is located at the lower side of the tubular body 280 and protrudes outwardly. A spring 292 is located between the part of the tubular body 280 and the movable core 230. The tubular body 280 and the valve body 220 are biased toward the injection port 211 by an elastic force of the spring 292.

The movable core 230 is a component that is a substantially cylindrical shape and is made of magnetic material such as a ferritic stainless steel. As the above description, the through hole is at the center of the movable core 230, and the valve body 220 is inserted to penetrate the through hole. An outer diameter of the movable core 230 is substantially equal to an inner diameter of the case. The movable core 230 is disposed to be movable in the longitudinal direction of the case.

A spring 291 is located at a position at the upper side relative to a cap. The cap is biased toward the lower side by an elastic force of the spring 291. When the fuel injector 20 is closed, a lower end of the cap is in contact with the upper surface 231 of the movable core 230. Thus, the elastic force of the spring 291 is transmitted to the movable core 230 through the cap. In other words, the movable core 230 is also biased toward the lower side.

A stator core 260 is located at the upper side relative to the movable core 230. The stator core 260 is a component that is a substantially cylindrical shape and is made of a magnetic material such as a ferritic stainless steel. The stator core 260 is fixed relative to the case. A gap is between the stator core 260 and the movable core 230.

A bush 270 that is a cylindrical shape is fixed at an inner peripheral side of the stator core 260. The bush 270 includes a lower end surface 271 that is located at a position at the lower side relative to a lower end of the stator core 260. When the fuel injector 20 is closed, the upper surface 231 of the movable core 230 is separated from the lower end surface 271 of the bush 270.

A coil 250 is located at an outer peripheral side of the stator core 260. When a driving current supplied from the control device 10 flows through the coil 250, a magnetic circuit is established in the movable core 230, the stator core 260 and the case. Thus, an electromagnetic force that is an attractive force between the movable core 230 and the stator core 260 is generated, and the movable core 230 receives a force applied toward the stator core 260.

Next, a valve-opening operation of the fuel injector 20 will be described. Changes of the fuel injector 20 from a valve-closing state to a valve-opening state are shown in (A), (B) and (C) of FIG. 5 in this order.

Figure 5:
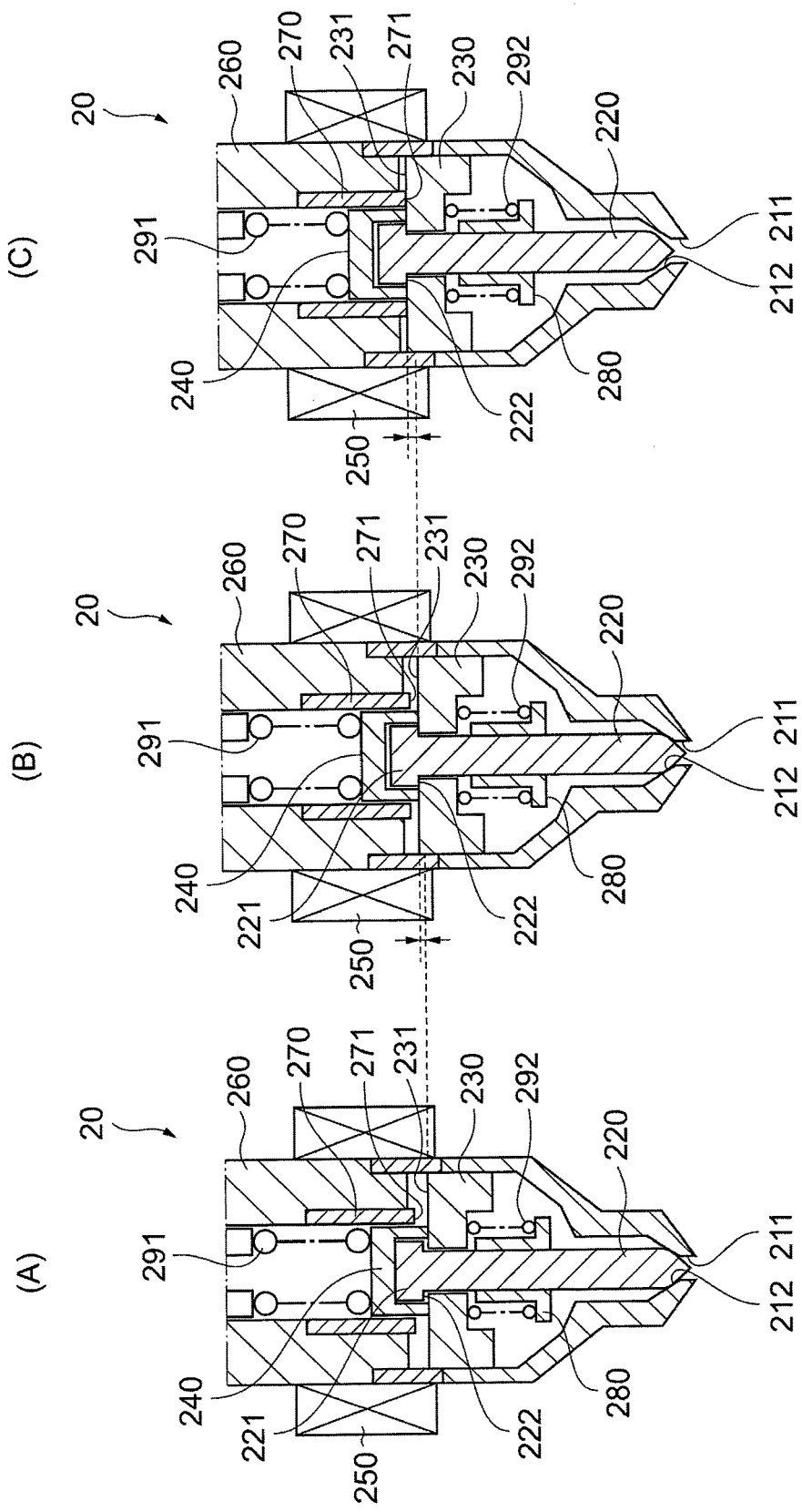
FIG. 5 includes (A), (B) and (C), (A) is a cross-sectional view showing a state where a driving current is not supplied to a fuel injector, (B) is a cross-sectional view showing a state where a valve-opening of the fuel injector starts, and (C) is a cross-sectional view showing a state where the valve-opening of the fuel injector is completed, in a mode of the fuel injector that is a control target of the control device shown in FIG. 1.

(A) of FIG. 5 shows a state where the driving current is not supplied to the fuel injector 20 and the fuel injector 20 is closed. In this case, the state is the valve-closing state. When the driving current starts to be supplied from the valve-closing state shown in (A) of FIG. 5, the electromagnetic force applied to the movable core 230 increases. When the electromagnetic force becomes greater than the elastic force of the spring 291, the movable core 230 starts to move toward the upper side.

In this case, since the valve body 220 and the movable core 230 are separated from each other while the valve body 220 receives the force applied toward the lower side by a pressure of the fuel, the force is not transmitted to the movable core 230. The movable core 230 is relatively smoothly accelerated toward the upper side, and a sufficient kinetic energy is accumulated in the movable core 230.

Then, as shown in (B) of FIG. 5, the upper surface 231 of the movable core 230 collides with the lower surface 222 of the diameter-enlarging part and is in contact with the lower surface 222. Since the sufficient kinetic energy is accumulated in the movable core 230, the valve body 220 starts to move toward the upper side by receiving the force greater than a fuel pressure that is the pressure of the fuel. In the fuel injector 20, the valve body 220 can be efficiently moved in a valve-opening direction according to a configuration where the movable core 230 and the valve body 220 are separated from each other in the valve-closing state in a case where the fuel pressure is relatively high.

The valve body 220 moves toward the upper side together with the movable core 230 after becoming in a state shown in (B) of FIG. 5. Thus, the opening degree of the fuel injector 20 increases, and then the injection rate of the fuel increases. The state shown in (B) of FIG. 5 is a state where the valve-opening of the fuel injector 20 starts.

Then, when a supply of the driving current is continued, the valve body 220 and the movable core 230 further move toward the upper side. Finally, as shown in (C) of FIG. 5, the valve body 220 and the movable core 230 reach an upper limit of a movable range. In a state shown in (C) of FIG. 5, the upper surface 231 of the movable core 230 is in contact with the lower end surface 271 of the bush 270. Since the opening degree of the fuel injector 20 becomes maximum, the injection rate of the fuel also becomes maximum. The state shown in (C) of FIG. 5 is a state where the valve-opening of the fuel injector 20 is completed. In other words, the state shown in (C) of FIG. 5 is the valve-opening state.

When the supply of the driving current is stopped from the state shown in (C) of FIG. 5, the attractive force between the movable core 230 and the stator core 260 becomes zero. Thus, the movable core 230 moves toward the lower side by the elastic force of the spring 291. Further, the valve body 220 moves toward the lower side by the elastic force of the spring 292 and the fuel pressure. The fuel injector 20 returns to the valve-closing state by changing as shown in (C), (B) and (A) of FIG. 5 in this order.

Figure 6:
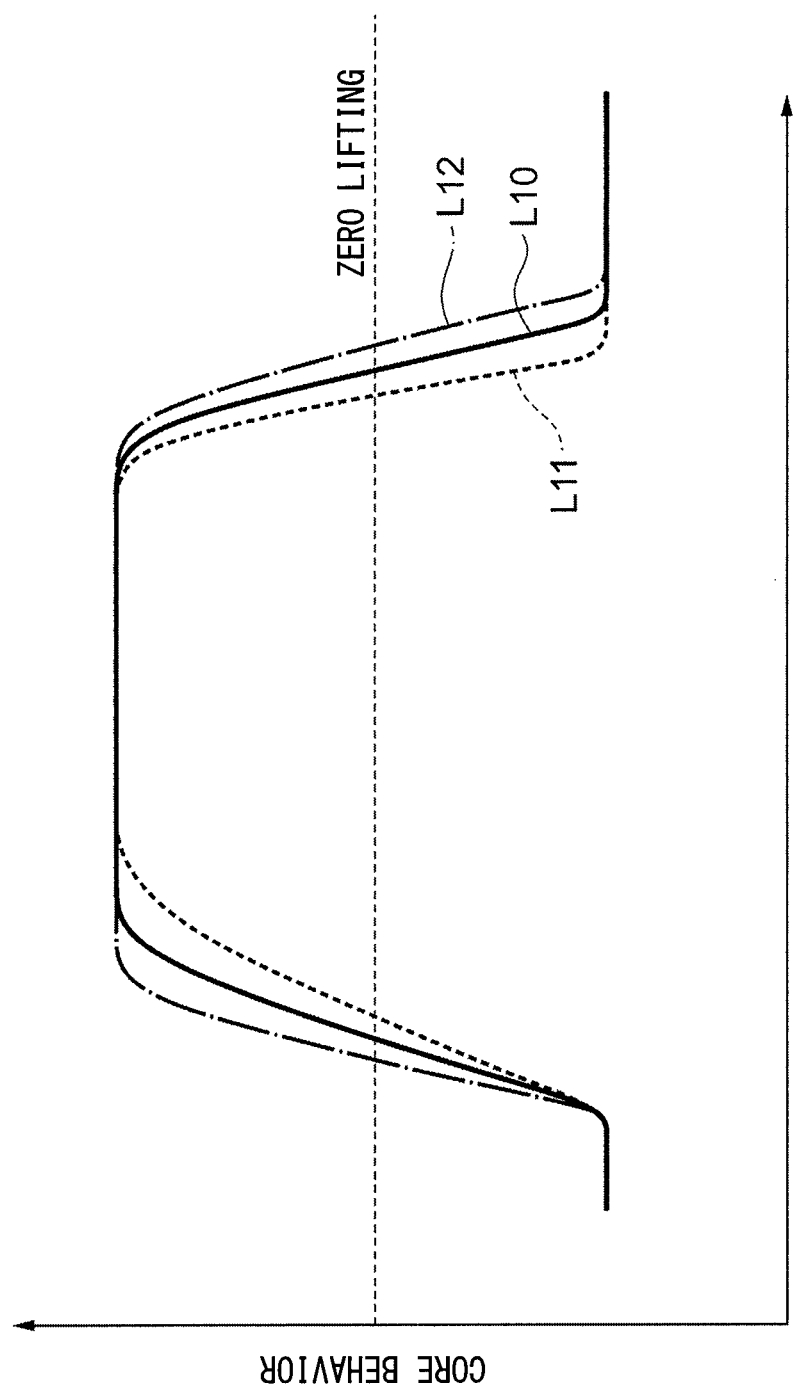
FIG. 6 is a graph illustrating a core behavior of the fuel injector shown in (A), (B) and (C) of FIG. 5.

FIG. 6 shows L10, L11 and L12 as an example of the valve-opening-closing profile of the fuel injector 20. L10, L11 and L12 show core behaviors when the driving current is applied, for individual fuel injectors 20 different from each other. The fuel injector 20 has a configuration where the movable core 230 is accelerated toward the upper side to collide with the valve body 220 and applies the force greater than the fuel pressure to the valve body 220. When the driving current is supplied to the fuel injector 20, the electromagnetic force applied to the movable core 230 increases. When the electromagnetic force becomes greater than the elastic force of the spring 291, the movable core 230 starts to move. Thus, a zero lifting that is a timing that the valve body 220 starts to open from a start of the movable core 230 changes according to a variation of a spring rate of the spring 291. Then, a behavior of the valve body 220 changes according to a variation of a spring rate of the spring 292. According to the present embodiment, in the control device 10, since the variations can be corrected, the fuel injection quantity can be adjusted to a target quantity.

Further, when the supply of the driving current to the fuel injector 20 is stopped, the movable core 230 moves toward the lower side by the elastic force of the spring 291, and the valve body 220 moves toward the lower side by the elastic force of the spring 291 and the fuel pressure. Thus, the behavior of the valve body 220 also changes according to variations of spring rates of the springs 291, 292 in a valve-closing. According to the present embodiment, in the control device 10, since the variations can be corrected, the fuel injection quantity can be adjusted to the target quantity.

Figure 7:
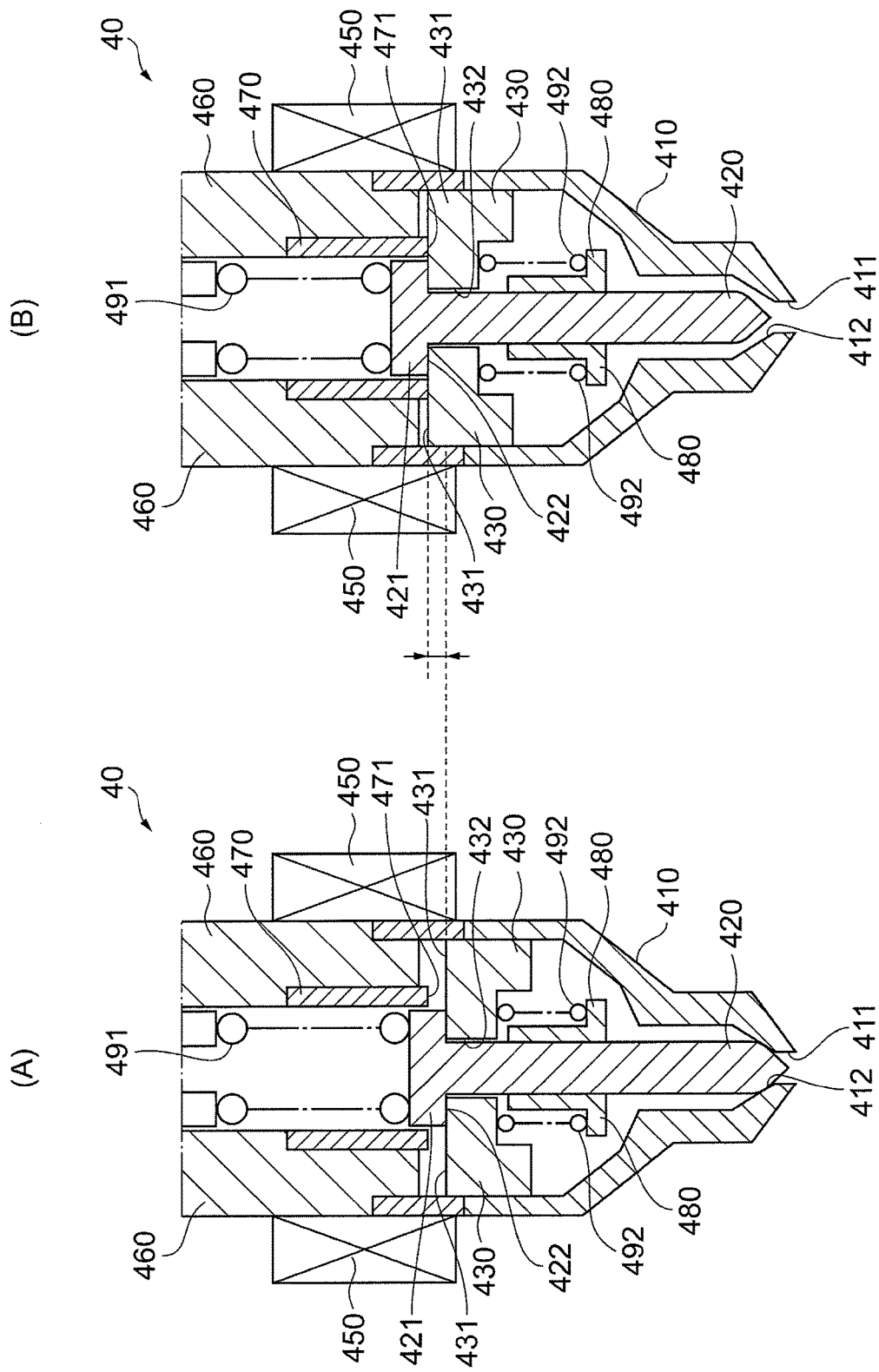
FIG. 7 includes (A) and (B), (A) is a cross-sectional view showing a valve-closing state of the fuel injector, and (B) is a cross-sectional view showing a valve-opening state, in a mode of the fuel injector shown in FIG. 1.

Not only the fuel injector 20 as the above description, but also a fuel injector 40 shown in FIG. 7 is the control target of the present embodiment. (A) of FIG. 7 shows an inner constitution of the fuel injector 40 in the valve-closing state. (B) of FIG. 7 shows the inner constitution of the fuel injector 40 in the valve-opening state. The fuel injector 40 has a configuration that a valve body 420 and a movable core 430 are received in a case 410 that is a container having a tubular shape. An injection port 411 that is an outlet of the fuel is at a tip end of the case 410. An inner wall surface of the case 410 includes a part that surrounds the injection port 411 and at which a valve seat 412 is located.

The valve body 420 is arranged to be movable in an up-down direction that is a longitudinal direction of the case 410. As shown in (A) of FIG. 7, when the valve body 420 is located at the lower side most, a lower end of the valve body 420 is in contact with the valve seat 412, and the injection port 411 is blocked. In this case, the fuel is not injected from the injection port 411. When the movable core 430 and the valve body 420 move toward the upper side, the lower end of the valve body 420 is removed from the valve seat 412. As a result, the fuel is injected from the injection port 411. A flow rate of the fuel injected from the injection port 411 per unit time increases in accordance with an increase in distance between the valve body 420 and the valve seat 412. In other words, when the valve body 420 moves toward the upper side, the opening degree of the fuel injector 40 increases.

The entire of the valve body 420 is a substantially columnar shape. The valve body 420 is inserted to penetrate a through hole 432 at a center of the movable core 430. The valve body 420 includes a diameter-enlarging part 421 that a diameter of the diameter-enlarging part 421 is greater than a diameter of the other part of the valve body 420. The diameter-enlarging part 421 is in the vicinity of an end part of the valve body 420 at the upper side. A lower surface 422 that is an end surface of the diameter-enlarging part 421 at the lower side is in contact with an upper surface 431 that is an end surface of the movable core 430 at the upper side.

A side surface of the valve body 420 includes a part that is located at the lower side relative to the movable core 430 and to which a tubular body 480 is fixed. The tubular body 480 includes a part that is located at the lower side of the tubular body 480 and protrudes outwardly. A spring 492 is located between the part of the tubular body 480 and the movable core 430. Since the spring 492 is arranged to be pressed, the movable core 430 receives the force applied from the spring 492 toward the upper side. Thus, the valve body 420 in contact with the upper surface 431 of the movable core 430 at the lower surface 422 also receives the force applied toward the upper side.

The movable core 430 is a component that is made of magnetic material such as a ferritic stainless steel. The movable core 430 is a substantially cylindrical shape. As the above description, the through hole 432 is at the center of the movable core 430. The valve body 420 is inserted to penetrate the through hole 432. An outer diameter of the movable core 430 is substantially equal to an inner diameter of the case 410. The movable core 430 is disposed to be movable in the longitudinal direction of the case 410.

A spring 491 is located at a position at the upper side relative to the diameter-enlarging part 421 of the valve body 420. The spring 491 is arranged to be pressed. Thus, the valve body 420 receives the force from the spring 491 toward the lower side.

A stator core 460 is located at the upper side relative to the movable core 430. The stator core 460 is a component that is substantially cylindrical shape and is made of magnetic material such as a ferritic stainless steel. The stator core 460 is fixed relative to the case 410. A gap is between the stator core 460 and the movable core 430.

A bush 470 is fixed at an inner peripheral side of the stator core 460. The bush 470 is a substantially cylindrical shape. A part of the diameter-enlarging part 421 of the valve body 420 is located in the bush 470. The bush 470 includes a lower end surface 471 that is located at a position at the lower side relative to a lower end of the stator core 460. When the fuel injector 40 is closed as shown in (A) of FIG. 7, the upper surface 431 of the movable core 430 is separated from the lower end surface 471 of the bush 470.

A solenoid 450 is located at an outer peripheral side of the stator core 460. An injection control device 100 supplies an electric power output by a battery that is not shown to the solenoid 450. When the driving current flows through the solenoid 450, a magnetic circuit is established in the movable core 430, the stator core 460 and the case 410. Thus, an electromagnetic force is generated between the movable core 430 and the stator core 460, and the movable core 430 receives a force applied toward the upper side.

When the driving current is not supplied to the fuel injector 40, the fuel injector 40 is in the valve-closing state shown in (A) of FIG. 7. When the supply of the driving current starts to open the fuel injector 40, the electromagnetic force applied to the movable core 430 increases. When a total force of the electromagnetic force and the force received by the movable core 430 from the spring 492 toward the upper side becomes greater than the force received by the movable core 430 from the spring 491 through the valve body 420 toward the lower side, the movable core 430 starts to move toward the upper side.

When the movable core 430 moves toward the upper side, the valve body 420 in contact with the upper surface 431 of the movable core 430 is pressed upwardly. Thus, the lower end of the valve body 420 is removed from the valve seat 412, and the injection of the fuel from the injection port 411 starts.

Then, when the driving current is supplied to the fuel injector 40, the movable core 430 and the valve body 420 further move upwardly. In this case, the opening degree of the fuel injector 40 increases, the flow rate of the fuel injected from the injection port 411 per unit time increases. Finally, the movable core 430 and the valve body 420 reach the upper limit of the movable range as shown in (B) of FIG. 7. In other words, a movement of the movable core 430 is completed in the valve-opening of the fuel injector 40. An operation of the fuel injector 40 switching from the valve-closing state shown in (A) of FIG. 7 to the valve-opening state shown in (B) of FIG. 7 is referred to as a valve-opening operation.

In the valve-opening state shown in (B) of FIG. 7, the upper surface 431 of the movable core 430 is in contact with the lower end surface 471 of the bush 470. In this case, since the opening degree of the fuel injector 40 becomes maximum, the flow rate of the fuel injected from the injection port 411 per unit time also becomes maximum.

When the supply of the driving current to the fuel injector 40 is stopped, the electromagnetic force between the movable core 430 and the stator core 460 disappears. In this case, the movable core 430 moves downwardly. The valve body 420 pressed upwardly by the movable core 430 also moves downwardly together with the movable core 430. Thus, the fuel injector 40 returns to the valve-closing state shown in (A) of FIG. 7.

Figure 8:
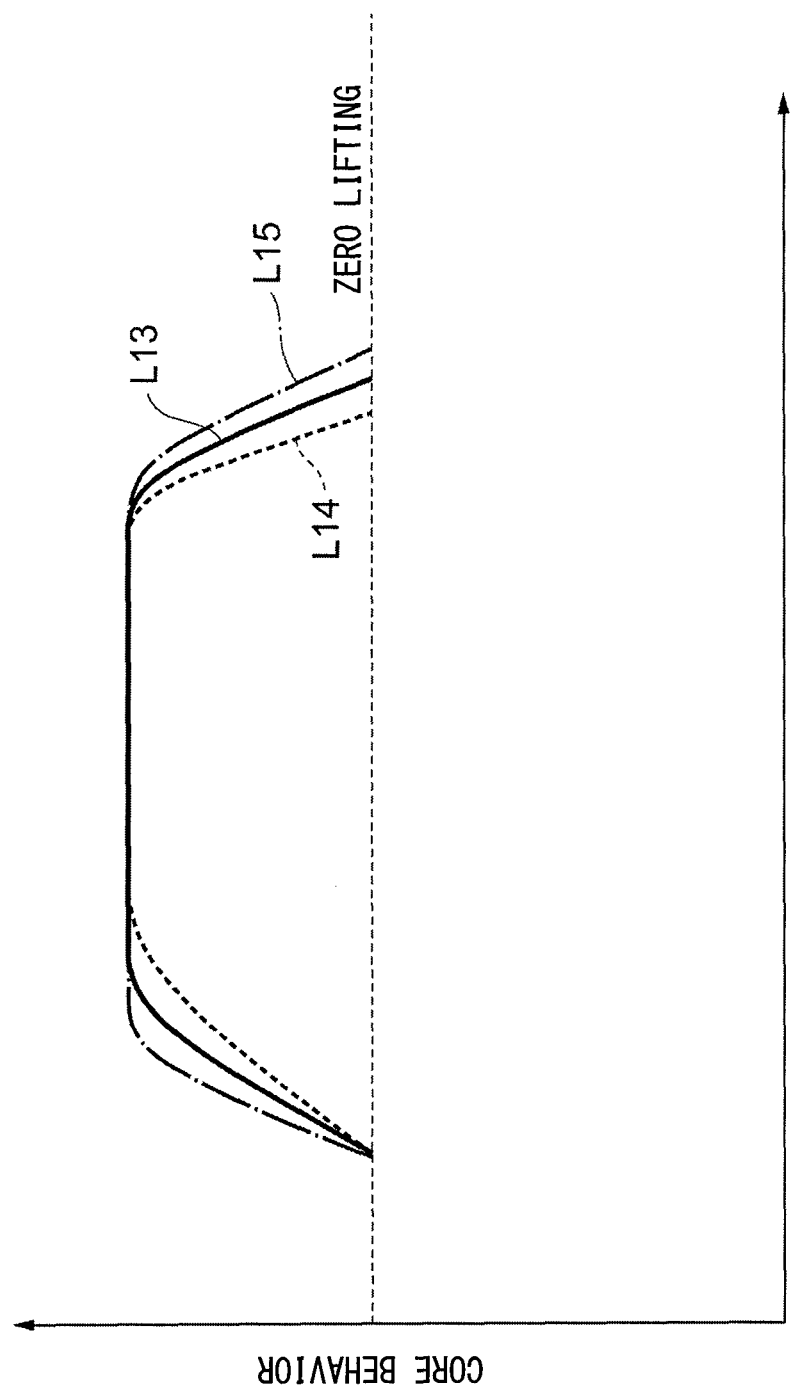
FIG. 8 is a graph illustrating the core behavior of the fuel injector shown in (A) and (B) of FIG. 7.

FIG. 8 shows L13, L14 and L15 as an example of the valve-opening-closing profile of the fuel injector 20. L10, L11 and L12 show core behaviors when the driving current is applied, for individual fuel injectors 40 different from each other. In the fuel injector 40, the valve-opening profile from the zero lifting is set by a balance between a reverse force of the spring 491 and the electromagnetic force to move the movable core 430 in the valve-opening direction. Then, the valve-opening profile changes according to a variation of the spring rate of the spring 491. In the fuel injector 40, the valve-closing profile is set by a balance between a reverse force of the spring 492 and the electromagnetic force of the spring 491 to press the movable core 430 back in the valve-closing direction. Then, the valve-closing profile changes according to variations of the spring rates of the springs 491, 492. According to the present embodiment, in the control device 10, since the variations can be corrected, the fuel injection quantity can be adjusted to the target quantity.

According to the present embodiment, the full-lifting valve-closing profile that can be specified is obtained according to the behavior of the electric signal including a driving voltage or the driving current, and the valve-opening profile is estimated according to the full-lifting valve-closing profile. Thus, a valve-body behavior that the valve body moves in the valve-opening direction while the driving signal is output and the valve body moves in the valve-closing direction until the valve body is closed while the driving signal is stopped can be obtained.

According to the present embodiment, the electric signal acquired by the control device 10 indicates a driving-voltage behavior of the fuel injector 20, 40. Since the driving-voltage behavior can be obtained as an output voltage when the driving current is supplied, the driving-voltage behavior can be readily obtained.

According to the present embodiment, the full-lifting valve-closing profile shown in FIG. 2 includes at least one of a valve-closing start timing of the valve body 220, 420, a valve-closing end timing of the valve body 220, 420, or a valve-closing responsivity of the valve body 220, 420. The valve-closing start timing of the valve body 220, 420 is obtained as decreasing start timings of L1A, L2A and L3A indicating the core liftings. Specifically, time periods from timings that L1A, L2A and L3A indicating the voltage behaviors start to decrease to timings that slope changes firstly are obtained. The valve-closing end timing of the valve body 220, 420 is obtained as decreasing end timings of L1A, L2A and L3A indicating the core liftings. Specifically, time periods from timings that L1A, L2A and L3A indicating the voltage behaviors start to decrease to timings that the slope further changes after changing firstly are obtained. The valve-closing responsivity of the valve body 220, 420 is obtained as decreasing tilt angles of L1A, L2A and L3A indicating the core liftings.

According to the present embodiment, the valve-opening profile shown in FIG. 3 includes at least one of a valve-opening start timing of the valve body 220, 420, a valve-opening end timing of the valve body 220, 420, or a valve-opening responsivity of the valve body 220, 420. The valve-opening start timing of the valve body 220, 420 is obtained as increasing start timings of L4A, L5A and L6A indicating the core liftings. Specifically, rising timings shown in the region B in (A) of FIG. 3 are obtained. The valve-opening end timing of the valve body 220, 420 is obtained as increasing end timings of L4A, L5A and L3A indicating the core liftings. The valve-opening responsivity of the valve body 220, 420 is obtained as increasing tilt angles of L4A, L5A and L6A indicating the core liftings.

The full-lifting valve-closing response acquisition unit 11 acquires the full-lifting valve-closing profile by obtaining a change of an induced electromotive force caused by a change of a velocity of the valve body 220, 420 from the full-lifting state to the closing state, as the voltage behavior.

The valve-opening response estimation unit 13 estimates the valve-opening profile based on the full-lifting valve-closing profile and at least one of a component of the fuel injector 20, 40 or information indicating an environment condition.

The partial-lifting valve-closing response acquisition unit 14 acquires the partial-lifting valve-closing profile by obtaining the change of the induced electromotive force caused by the change of the velocity of the valve body 220, 420 from the partial-lifting state to the closing state, as the voltage behavior.

The correction control unit 16 corrects the fuel injection quantity injected by the fuel injector 20, 40 based on the partial-lifting fuel injection quantity, and outputs the driving signal corresponding to the fuel injection quantity that is corrected.

As the above description, the embodiment of the present disclosure is described. However, the present disclosure is not limited to the above embodiment. Such changes and modifications are to be understood as being within the scope of the present disclosure as defined by the appended claims. The elements and their arrangements, materials, conditions, shapes, and the like included in the specific examples described above are not limited to those exemplified but can be modified as appropriate. In addition, while the various combinations and configurations, which are preferred, other combinations and configurations, including more, less or only a single element, are also within the spirit and scope of the present disclosure.

The invention claimed is:

1. A control device to output a driving signal to a fuel injector, comprising:
    a full-lifting valve-closing response acquisition unit to acquire a full-lifting valve-closing profile indicating a valve-closing behavior of the fuel injector from a full-lifting state of a valve body constituting the fuel injector, based on a behavior of an electric signal from the full-lifting state to a closing state of the valve body; and
    a valve-opening response estimation unit to estimate a valve-opening profile indicating a valve-opening behavior when a valve-opening driving signal is input to the fuel injector, based on at least the full-lifting valve-closing profile.

2. The control device according to claim 1, wherein
    the electric signal indicates a driving-voltage behavior of the fuel injector.

3. The control device according to claim 1, wherein
    the full-lifting valve-closing profile includes at least one of a valve-closing start timing of the valve body, a valve-closing end timing of the valve body or a valve-closing responsivity of the valve body.

4. The control device according to claim 1, wherein
    the valve-opening profile includes at least one of a valve-opening start timing of the valve body, a valve-opening end timing of the valve body or a valve-opening responsivity of the valve body.

5. The control device according to claim 1, wherein
the full-lifting valve-closing response acquisition unit is to acquire the full-lifting valve-closing profile by obtaining a change of an induced electromotive force caused by a change of a velocity of the valve body from the full-lifting state to the closing state, as a voltage behavior.

6. The control device according to claim 1, wherein
the valve-opening response estimation unit is to estimate the valve-opening profile based on the full-lifting valve-closing profile and based on at least one of a component of the fuel injector or information indicating an environment condition.

7. The control device according to claim 1, further comprising:
a partial-lifting valve-closing response acquisition unit to acquire a partial-lifting valve-closing profile indicating a valve-closing behavior of the fuel injector from a partial-lifting state of the valve body, based on the behavior of the electric signal from the partial-lifting state to the closing state of the valve body; and
a partial injection quantity estimation unit to estimate a partial-lifting fuel injection quantity in a partial lifting of the fuel injector, based on the valve-opening profile and the partial-lifting valve-closing profile.

8. The control device according to claim 7, wherein
the partial-lifting valve-closing response acquisition unit is to acquire the partial-lifting valve-closing profile by obtaining a change of an induced electromotive force caused by a change of a velocity of the valve body from the partial-lifting state to the closing state of the valve body, as a voltage behavior.

9. The control device according to claim 7, further comprising:
a correction control unit to correct the fuel injection quantity injected by the fuel injector based on the partial-lifting fuel injection quantity and to output the driving signal corresponding to the fuel injection quantity that is corrected.

* * * * *